United States Patent
Marrocco, III et al.

(10) Patent No.: US 7,268,193 B2
(45) Date of Patent: Sep. 11, 2007

(54) BRANCHED POLYPHENYLENE POLYMERS

(75) Inventors: Matthew L. Marrocco, III, Fontana, CA (US); Mark S. Trimmer, Monrovia, CA (US); Ying Wang, Diamond Bar, CA (US)

(73) Assignee: Mississippi Polymer Technologies, Inc., Bay St. Louis, MS (US)

( * ) Notice: Subject to any disclaimer, the term of this patent is extended or adjusted under 35 U.S.C. 154(b) by 150 days.

(21) Appl. No.: 11/073,043

(22) Filed: Mar. 4, 2005

(65) Prior Publication Data

US 2005/0261459 A1   Nov. 24, 2005

Related U.S. Application Data

(60) Provisional application No. 60/550,595, filed on Mar. 4, 2004.

(51) Int. Cl.
*C08F 283/08* (2006.01)
*C08G 61/10* (2006.01)

(52) U.S. Cl. .................. 525/534; 525/133; 525/144; 525/146; 525/147; 525/191; 525/192; 525/197; 525/203; 525/219; 525/235; 525/334.1; 528/86; 528/98; 528/99; 528/169; 528/174; 528/218; 528/219

(58) Field of Classification Search ............... 525/534, 525/133, 144, 146, 147, 191, 192, 197, 203, 525/219, 235, 334.1; 528/86, 98, 99, 169, 528/174, 218, 219
See application file for complete search history.

(56) References Cited

U.S. PATENT DOCUMENTS

| | | |
|---|---|---|
| 5,227,457 A | 7/1993 | Marrocco, III et al. |
| 5,625,010 A | 4/1997 | Gagne et al. |
| 5,670,564 A | 9/1997 | Gagne et al. |
| 5,886,130 A | 3/1999 | Trimmer et al. |

OTHER PUBLICATIONS

Kovacic et al., "Dehydro Coupling of Armoatic Nuclei by Catalyst-Oxidant Systems: Poly (*p*-phenylene)" Chem. Rev. 1987, vol. 87, No. 2, pp. 357-379.
Kim et al., "Hyperbranched Polyphenylenes", Macromolecules, vol. 25, No. 21, Oct. 12, 1992, pp. 5561-5572.

*Primary Examiner*—Duc Truong
(74) *Attorney, Agent, or Firm*—Christie, Parker & Hale, LLP

(57) ABSTRACT

Branched polyarylene polymers are provided comprising monovalent endcappers, divalent linear units, and polyvalent branching units. The composition of the polymers is controlled by adjusting the ratio of the three types of monomers.

58 Claims, No Drawings

BRANCHED POLYPHENYLENE POLYMERS

CROSS-REFERENCE TO RELATED APPLICATION(S)

This application claims the benefit of U.S. Provisional Application Ser. No. 60/550,595, filed Mar. 4, 2004, the content of which is hereby incorporated by reference in its entirety.

STATEMENT REGARDING FEDERALLY SPONSORED RESEARCH OR DEVELOPMENT

The U.S. Government has certain rights in this invention pursuant to Contract No. N00014-94-C-0212, awarded by the Department of the Navy.

FIELD OF THE INVENTION

The present invention is directed to polyphenylene polymers and more specifically to branched polyphenylene compositions where the degree of branching is controlled by the selection of mono-, di-, and polyfunctional monomers.

BACKGROUND OF THE INVENTION

Polyphenylene polymer of various structural types is known. Linear polyphenylenes may be of the rigid-rod type as disclosed in U.S. Pat. No. 5,227,457, semi-rigid as disclosed in U.S. Pat. No. 5,886,130, and may have reactive side groups as disclosed in U.S. Pat. No. 5,625,010 or end groups as disclosed in U.S. Pat. No. 5,670,564, the entire contents of which patents are incorporated herein by this reference. Polyphenylenes may also have a branched (Kovacic et al., *Chem. Rev.*, 1987, 87, 357-379), or hyperbranched (Kim et al., *Macromol.*, 1992, 25, 5561-5572) structure.

The backbone of polyphenylene polymers is very strong and chemically and thermally inert. If other repeat units or side groups incorporated into polyphenylene are also strong and inert the polymer as a whole will exhibit these properties. The polyphenylene backbone also has a low dielectric constant, low affinity for water, and a high refractive index. These features are desirable for a wide variety of products, including films, fibers, molded and extruded parts, coatings, foams, and composites.

Linear polyphenylenes suffer from low solubility and are generally difficult to process. Selection of appropriate side groups, as in U.S. Pat. Nos. 5,227,457 and 5,886,130, is essential for practical levels of solubility and for melt processability. Inclusion of branch points also may aid solubility and processability; however, previous branched polyphenylenes either have been prepared from costly and/or unstable monomers (e.g. diethynylbenzenes) or have had uncontrollable levels of branching.

Hyper-branched polyphenylenes have controlled amounts of branching; however, they are, by design, maximally branched. Hyper-branched polymers have some interesting properties but, unlike linear and lightly branched polymers, do not entangle and are therefore poor film formers and are generally brittle when molded.

It would be desirable to have polyphenylene polymers with all of the above mentioned positive attributes, including high strength, low dielectric constant, low water uptake, chemical and thermal stability, easy processibility into tough films, fibers, foams, molded parts and the like, and low cost. An improvement in the art would be a polyphenylene material with a controllable degree of branching, thus providing a means for improving solubility and processibility.

SUMMARY OF THE INVENTION

The current invention is directed to polyphenylene compositions that are moderately to lightly branched, with the degree and type of branching easily controllable by selection of the starting monomers.

It is well known that unsubstituted polyphenylenes are insoluble and infusible. It is also known that by appending appropriately selected solubilizing side groups to the polyphenylene backbone, both solubility and fusibility are imparted (for example, see U.S. Pat. No. 5,227,457). The particular polymer poly(benzoyl-1,4-phenylene) is an example of a soluble, melt processable, rigid-rod polyphenylene. While the side groups are necessary for solubility and fusibility, they impart some undesired properties, such as an increased dielectric constant (relative to an unsubstituted polyphenylene), altered photophysical properties including a slight yellow color and quenching of fluorescence, and benzophenone-like chemical reactivity. Attempts to reduce or eliminate the undesired properties by preparation of co-polymers like poly(benzoyl-1,4-phenylene-co-1,4-phenylene), which comprises both substituted and unsubstituted phenylene repeat units, are severely limited by rapid loss of solubility as benzoyl groups are removed. For example, poly(benzoyl-1,4-phenylene-co-1,4-phenylene) with half of its repeat units unsubstituted has solubility too low for most practical applications. Low solubility results in polymer precipitation before molecular weights have grown to useful extents.

We have found that introduction of a limited number of branches can increase the solubility of polyphenylenes. A branched polyphenylene requires fewer solubilizing side groups to impart solubility in organic solvents. Unlike dendrimeric and hyperbranched polyphenylenes, which are poor film formers and are brittle, the branched polymers of the present invention can be cast into freestanding films.

Thus, one embodiment of the present invention is directed to a polymer having a general formula:

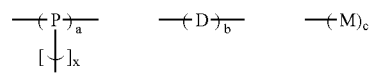

where P is a polyvalent arylene branching repeat unit, D is a divalent arylene repeat unit, M is a monovalent arylene endcapping unit, a, b and c are the relative mole fractions of P, D and M, respectively, and x represents the number of bonds beyond two connecting P to the polymer chain, wherein $x \geq 1$.

In one embodiment, this polymer may additionally comprise solubilizing side chains and/or reactive side chains.

In still another embodiment, the polymer comprises at least two different monovalent repeat units, at least two different divalent repeat units, and/or at least two different polyvalent repeat units.

Still another embodiment of the present invention is directed to a polymer having the formula:

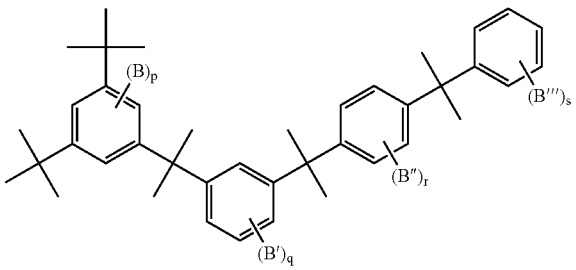

wherein B, B', B", and B'" are side groups, which may be the same or different, and which are independently selected from the group consisting of nil, alkyl, aryl, alkaryl, aralkyl, alkyl amide, aryl amide, alkyl ester, aryl ester, alkoxy, polyalkeneoxy, polyphenylene oxide, polyphenylene sulfide, polyvinyl chloride, polyalkylmethacrylate, polyacrylonitrile, polyalkylvinyl ether, polyvinyl alcohol, polyvinyl acetate, perfluoroalkyl, perfluoroalkoxy, polyester, polyamide, polyimide, poly(phenoxyphenyl ketone), amide, ester, ether, sulfone, aryl ketone, alkyl ketone, heteroaryl, and NRR', p is 0, 1, 2 or 3, q is 0, 1, 2, 3, or 4, r is 0, 1, 2, 3, or 4, and s is 0, 1, 2, 3, 4, or 5.

In another embodiment of the present invention, this polymer may additionally comprise solubilizing side chains and/or reactive side chains.

In still another embodiment of the present invention, one or more of the side groups, B, B', B", or B'" is selected from the group consisting of epoxy, ethynyl, phenylethynyl, acetals, acetals from ethylvinylether, acetylenes, acid anhydrides, acrylamides, acrylates, aldehydes, alkyl aldehydes, alkyl halides, alkyl nitriles, aryl aldehydes, aminoalkyl, aminoaryl, aminophenoxy, aminobenzoyl, anilines, azides, benzocyclobutenes, biphenylenes, carbonates, carboxylic acids and their salts, carboxylic acid halides, cyanates, epoxides, fulvenes, halides, heteroaryls, hydrazines, hydroxyls, hydroxylamines, monohydroxyalkyl, hydroxyaryl, hydroxyphenoxy, hydroxybenzoyl, amides, esters, amines, imides, imines, isocyanates, ketals, ketones, maleimides, nadimides, olefins, phenols, phosphates, phosphonates, quaternary amines, silanes, silicates, silicones, sulfonic acids and their salts, sulfonyl halides, tetrahydropyranyl ethers, thioethers, urethanes, vinyl ethers, and vinyls.

Yet another embodiment of the present invention is directed to a polymer composition prepared by reductive polymerization of at least one aromatic monofunctional monomer having one X group (an endcapper), at least one aromatic difunctional monomer having two X groups (a linear monomer), and at least one aromatic polyfunctional monomer having three or more X groups (a branching monomer), wherein the X groups are selected from the group consisting of chloro, bromo, and sulfonate ester —SO$_3$R, wherein R is alkyl, aryl, fluoroalkyl, or fluoroaryl.

In still other embodiments, the present invention is directed to molding compounds, foams, composites, coatings, polymer blends, optical or opthalmic lenses, dielectric films, extruded parts, molded parts and/or solutions comprising the disclosed polymers and polymer compositions.

DETAILED DESCRIPTION OF THE INVENTION

All publications mentioned herein are incorporated herein by reference for the purpose of describing and disclosing, for example, the compositions, materials and methodologies that are described in the publications which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

Unless defined otherwise, all technical and scientific terms used herein have the same meaning as commonly understood to one of ordinary skill in the art to which this invention belongs.

As used throughout, polyvalent and polyfunctional are considered equivalent terms and are used interchangeably, as are divalent and difunctional, and monovalent and monofunctional.

A "P-type monomer" or "polyfunctional monomer" is the precursor to a polyvalent or polyfunctional P repeat unit. Similarly, a "D-type monomer" or "difunctional monomer" is the precursor to a divalent or difunctional D repeat unit and an "M-type monomer" or "monofunctional monomer" is the precursor to a monovalent or monofunctional endcapping unit.

Although any methods, devices and materials similar or equivalent to those described herein can be used in the practice or testing of the invention, the preferred methods, devices and materials are now described.

In one embodiment of the present invention the polymers have a composition represented by:

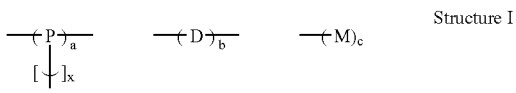

Structure I where P is a polyvalent branching repeat unit, D is a divalent repeat unit, M is a monovalent endcapping unit, a, b and c are the relative mole fractions of P, D and M respectively, and x is one or more, where x represents the number of bonds beyond two connecting P to the polymer chain. In a preferred embodiment, P, D, and M are all aryl units, and may be comprised of a single aromatic ring, multiple rings, or more than one fused ring.

In an exemplary embodiment of Structure I, a lightly branched polyphenylene based copolymer which is soluble and processible is synthesized using 1,3,5-trichlorobenzene as P, 1,3-dichlorobenzene and 2,5-dichlorobenzophenone as D, 4-chlorobenzophenone as M, with a=0.02, b=0.96, c=0.02, and x=1. Details of the synthesis of this copolymer are provided below in Example 15.

In another exemplary embodiment of Structure I, a lightly branched polyphenylene based copolymer which is soluble and processible is synthesized using 1,3,5-trichlorobenzene as P, 1,3-dichlorobenzene and 2,5-dichlorobenzophenone as D, and chlorobenzene as M, with a=0.06, b=0.88, c=0.06, and x=1. Details of the synthesis of this copolymer are provided below in Example 16.

By "solubilizing group" or "solubilizing side group" is meant functional groups which, when attached as side chains to the polymer in question, will render it soluble in an appropriate solvent system. It is understood that various factors must be considered in choosing a solubilizing group for a particular polymer and solvent, and that, all else being the same, a larger or higher molecular weight solubilizing group will induce a higher degree of solubility. Conversely, for smaller solubilizing groups, matching the properties of the solvent and solubilizing groups is more critical, and it may be necessary to have, in addition, other favorable interactions inherent in the structure of the polymer to aid in solubilization.

Some or all of the P units, some or all of the D units, and some or all of the M units independently may bear solubilizing side groups, including but not limited to alkyl, aryl, alkyl ketone, aryl ketone, amide, amine, ester, ether, fluoroalkyl, fluoroaryl, heteroaryl, sulfone, and thioether. Non-limiting examples of aryl ketone side groups are benzoyl, 2-naphthoyl, 2-methylbenzoyl(2-toluoyl), —CO-(1,4-phenylene-O-1,4-phenylene-CO-)$_x$-phenyl, and 4-phenoxybenzoyl. Non-limiting examples of heteroaryl side groups are 2-pyridyl, 2-benzoxazoyl, and 2-pyrimidyl. Non-limiting examples of ether side groups are hexyloxy, cyclohexyloxy, phenoxy, —OCH$_2$CH$_2$OCH$_2$CH$_2$OCH$_3$, polyphenyleneoxy, —O-(-1,4-phenylene-oxy-)$_x$-phenyl, polyethyleneoxy, —O—(—CH$_2$CH$_2$O—)$_x$—CH$_2$CH$_3$, and —OCH$_2$CF$_3$. Side groups may be oligomeric or polymeric.

In order to prevent crosslinking into an insoluble polymer, the amount of endcaps M should be adjusted to balance the number of branches. The quantity c should be nearly equal to the product of x and a, or xa. Preferably c is within 50% of xa, more preferably within 25% of xa, and even more preferably within 10% of xa.

One skilled in the art will recognize that in addition to M there may be adventitious endcappers that also limit the molecular weight. In such cases c should be less than xa. If the reactivity of the M type monomer is lower than that of the P and D type monomers it may be advantageous that c be larger than xa.

To determine optimal ratios of c/a, a series of polymers should be prepared varying the amount of M (i.e., varying c). The MW of the resulting polymers may be measured, for example, by gel permeation chromatography, and the solubility checked in various solvents. If the MW is too high, or solubility too low, then the mole fraction, c, of M should be increased relative to the mole fraction, a, of P.

Solubility and processibility are also controlled by the relative number of repeat units bearing solubilizing side groups. As discussed above, it may be desirable to limit the number of side groups. A series of test polymer compositions may be prepared having a, b, c, and x, fixed, but varying the fraction of repeat units bearing side groups. For example, a series of five polymers could be prepared, where a=0.1, b=0.8, c=0.1, and x=1, and where 90%, 85%, 80%, 75%, and 70% of the D repeat units bear solubilizing side groups and all remaining monomers units are unsubstituted. A second series of polymers may be prepared based on the solubility of the first series, for example, if the polymer in the first series having 85% side groups was sufficiently soluble, but 80% was not, a new series with 85%, 84%, 83%, 82%, and 81% substituted would be prepared and tested. If the polymer with 70% side groups was sufficiently soluble, then a new series with 65%, 60%, 55%, and 50% side groups would be prepared and tested. These examples are for illustrative purposes only. One could experimentally test any number of polymers having various values for a, b, c, and x to determine the optimum degree of branching, solubility, and molecular weight for desired properties.

It may be desirable to have 100% of D repeat units substituted with solubilizing side groups. It may also be desirable to have 100% of P, D, and/or M repeat units substituted with solubilizing side groups.

The side groups may also be reactive side groups or solubilizing reactive side groups, as disclosed for the linear polyphenylenes of U.S. Pat. Nos. 5,625,010 and 5,670,564 referred to above. In this embodiment the branched polymers could react further, for example, to cure on the application of heat or to form graft copolymers on the addition of a monomer or polymer reactive with the reactive side groups.

Non-limiting examples of reactive side groups include acetals, acetals from ethylvinylether, acetylenes, acetyls, acid anhydrides, acids, acrylamides, acrylates, alcohols, aldehydes, alkanols, alkyl aldehydes, alkyl ketones, amides, amines, alkyl halides, anilines, aryl aldehydes, aryl ketones, azides, benzocyclobutenes, biphenylenes, carbonates, carboxylates, carboxylic acids and their salts, carboxylic acid halides, carboxylic anhydrides, cyanates, cyanides, epoxides, esters, ethers, formyls, fulvenes, halides, heteroaryls, hydrazines, hydroxylamines, imides, imines, isocyanates, ketals, ketoalkyls, ketoaryls, ketones, maleimides, nadimides, nitriles, olefins, phenols, phosphates, phosphonates, quaternary amines, silanes, silicates, silicones, silyl ethers, styrenes, sulfonamides, sulfones, sulfonic acids and their salts, sulfonyl halides, sulfoxides, tetrahydropyranyl ethers, thioethers, urethanes, vinyl ethers, vinyls and the like. In some cases, the functional side groups are capable of reacting with each other.

In another embodiment of the present invention, branched polyphenylenes are formed by the copolymerization of monomers, at least one selected from each of the three groups Group P, Group D, and Group M as shown below:

Group P

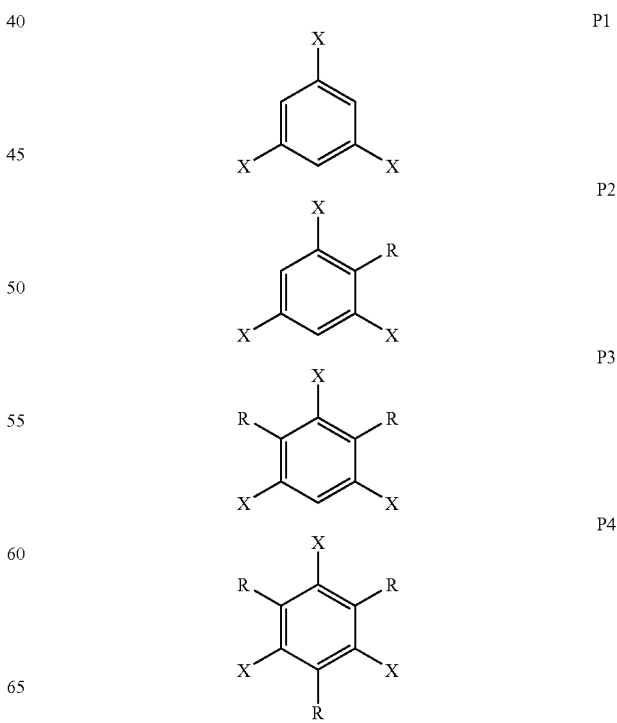

where X is selected from —Cl, —Br, and sulfonate esters, which sulfonate ester is preferably triflate (trifluoromethylsulfonate) ester, i is 3 or more, X's may be on any position on a ring or fused ring or on any ring of a multi-ring system, except that X may not be ortho to another X, the R's are selected independently from the following:

—Alkyl    —Aryl    —Heteroaryl    —F

—C(O)Alkyl    —C(O)Ar    —CF₃    —SO₂Ar

—(CF₂)ₓCF₃    —(4-pyridyl)    —(2-pyrimidyl)

—(1,3,4-oxadiazol-2-yl)-Ar    —(benzoxazol-2-yl)    —(CH₂)ₓCF₃, aryl ether, and alkyl ether, o is 0 (no side group) or 1 or more, such that each hydrogen on the ring may be replaced by an R group, Ar is C6 to C24 aryl or heteroaryl, E is divalent —O—, —S— or >NR', the dotted semicircle represents one or more fused aromatic rings, A and B are independently nil, or divalent groups >CR'R', —O—, >NR', —S—, >CO, —CR'R'CR'R'—, or >CF$_2$, and R' are independently H, alkyl, or aryl. Adjacent rings, either on the same repeat unit or neighboring repeat units may be bridged by the side groups. Side groups may also be selected from those listed in U.S. Pat. Nos. 5,227,457, 5,565,543, 5,625,010, 5,654,392, 5,670,564, and 5,886,130, all of which are incorporated herein in their entirety by this reference.

Note that more than one type of repeat unit can be included from any or all of the groups P, D, and M. A non-limiting example of a composition having more than one D type repeat unit is the aforementioned poly(benzoyl-1,4-phenylene-co-1,4-phenylene) polymer, which could be prepared to include P-type branching monomers according to the present invention. In one embodiment, the invented polymer contains more than one P-type repeat unit. Each P monomer need not have equal values of x, for example, a polymer could contain a fraction of P-type monomers having three bonds to the backbone (x=1) and a second fraction of P-type monomers having four bonds to the backbone (x=2).

The side groups may be added or modified after polymerization. For example, a phenoxy side group may be brominated to give a bromophenoxy side group. Note that all of the phenoxy side groups need not be brominated; the polymer may be partially brominated. The bromophenoxy side group may be treated with phenylacetylene and a Pd/Cu catalyst to give a phenylethynylphenoxy side group. The phenylethynylphenoxy side group is a reactive side group and cures on heating to crosslink the polymer. The polymers of the instant invention may be prepared by reductive coupling of haloaromatics selected from substituted or unsubstituted 1,3,5-trihalobenzene, 1,3-dihalobenzene, 1,4-dihalobenzene, and monohalobenzene. Halo as used in the term haloaromatics means Cl, Br, I, tosylate, mesylate, triflate, sulfate ester, preferably Cl.

The preferred method of polymerization is reductive polymerization with zinc dust as reducing agent and a nickel catalyst as disclosed in U.S. Pat. Nos. 5,227,457, 5,565,543, and 5,654,392, referred to above.

The nickel catalyst may be derived from nickel chloride or nickel bromide and a monodentate ligand, preferably triphenylphosphine (TPP), although other nickel complexes may be used. Where the polymers of the instant invention are prepared by nickel catalyzed coupling, it is preferred that at least one of the side groups on monomers that bear side groups are electron withdrawing groups.

The polymers of the present invention also may be prepared by Suzuki coupling of mono, di, and polyhalo monomers with diboronic acid or ester monomers, with optional mono or polyboronic acid or ester monomers. Suzuki coupling also may be conducted with mono, di, and polyboronic acid or ester monomers with dihalo monomers, with optional mono or polyhalo monomers. Other methods of aryl coupling, such as Stille coupling, Miyura coupling, and Negishi coupling, may also be applied to prepare the branched polyarylenes of the present invention. Unlike nickel coupling, the Suzuki and similar methods do not require electron withdrawing side groups.

The polymers of the present invention are useful for applications where the properties of low dielectric constant, low moisture uptake, melt and solvent processibility, and excellent chemical and thermal stability are desired. Such applications include fibers, films, coatings, molded parts, foams, adhesives, composite matrix resins, additives for other polymers, and the like. Specific applications include printed wiring boards, dielectric materials for integrated circuits, molding compounds for electrical connectors, lead frames, switches and the like, molding compounds for automotive applications, molding compounds for orthopedic fixtures, tubing, catheters, and other devices for biomedical or dental applications, optical polymers, opthalmic polymers, honeycomb material for structural parts for aircraft, ships, trucks, and trains, scratch resistant coatings for windows, glazings, and displays, molding compounds for gears, bearings, linkages, and mechanical parts for industrial equipment and consumer appliances and electronics, pipe, tubing, rod, and profile for general manufacturing, and additives to modify the glass transition temperature, hardness, solvent resistance, stiffness, modulus, flammability, and toughness of other polymers and resins.

The polymers of the present invention also have use as materials for electroluminescent devices and as luminescent materials in general. Because of the extended polyphenylene chains, the compositions disclosed herein will fluoresce unless side groups with fluorescence quenching properties are selected. The branched polyphenylenes will be good electron and hole transport polymers. Electron transport may be enhanced through selection of side groups that are easily and reversibly reduced, including, but not limited to, groups such as oxadiazole, perfluorophenyl, pyridyl, pyrazinyl, benzoxazole, benzthiazole, benztriazole, and benzothiadiazole. Hole transport may be enhanced through selection of side groups that are easily and reversibly oxidized, including, but not limited to, groups such as carbazole, triarylamine, naphthylamines, and thiazine. Electron and hole transport polymer may be used as electron and hole transport layers in Organic Light Emitting Diodes (OLEDs) and Polymer OLEDs (POLEDs). Because of their fluorescence, the polymers of the present invention may be used as light emitting layers in OLEDs and POLEDs. They may be used as the pure polymer or doped with other fluorescent or phosphorescent materials.

The polymers of the present invention also may be used as materials for Proton Exchange Membranes (PEMs). PEMs have applications in fuel cells.

EXAMPLES

Example 1

Activation of Zinc

Commercially available 325 mesh zinc dust (100 g) was stirred in 100 ml methanol using an overhead stirrer, under nitrogen. A solution of 2 ml conc. HCl in 18 ml methanol was added slowly over about 20 min until the dull gray color of the suspended zinc began to brighten. The mixture was then filtered on a glass frit filter and dried under a stream of nitrogen. The activated zinc powder should be sieved before use to remove any lumps.

Example 2

Poly(1,4-(benzoylphenylene)$_{0.92}$-co-1,3,5-phenylene$_{0.4}$-co-phenylene$_{0.4}$)

A 100 ml round bottom flask was loaded with bis-triphenylphosphine nickel dichloride (0.593 g, 0.906 mmol), triphenylphosphine (3.21 g, 14.04 mmol), activated zinc dust (3.00 g, 45.92 mmol), sodium iodide (0.73 g, 4.86 mmol) and N-methylpyrrolidinone (NMP) (45.33 ml) in an inert atmosphere box. The flask was closed and brought out of the inert atmosphere box. While maintaining the flask under an inert atmosphere, monomers were added in the following amounts: 8.09 g (32.2 mmol) of 2,5-dichlorobenzophenone, 0.254 g (1.4 mmol) of 1,3,5-trichlorobenzene, and 0.158 g (1.4 mmol) of chlorobenzene. The mixture exothermed and cooling was applied to keep the temperature below 92° C. The mixture became viscous in about 10 min. When the exotherm subsided the flask was heated to 65° C. with stirring for 2 hr. The mixture was cooled to room temperature, stirred with ethanolic HCl, and washed with hot ethanol and then hot acetone. The resulting white solid was filtered and dried. Gel permeation chromatography (GPC) indicated a weight average molecular weight $M_W$=296,156, number average molecular weight $M_N$=89,251, and polydispersity=3.3, against polystyrene calibration standards.

Examples 3-14

The following compositions were prepared using the same general procedure as in Example 2, where monomer D1 is 1,3-dichlorobenzene, monomer D3 is 1,4-dichlorobenzene, monomer D4 is 2,5-dichlorobenzophenone, monomer P1 is 1,3,5-trichlorobenzene, and monomer M1 is chlorobenzene. Solubility was tested in hot NMP. The values in columns 2 through 6 of the table indicate the mole percent of the particular monomer added to the reaction flask. The total amount of monomer was kept nearly constant while the relative monomer amounts were varied.

| Ex. | D1 | D3 | D4 | P1 | M1 | Comments |
|---|---|---|---|---|---|---|
| 3 | | | 96 | 4 | | Insoluble |
| 4 | 90 | | | 5 | 5 | Soluble, melts, $M_W$ 75,386 |
| 5 | 60 | 30 | | 5 | 5 | Insoluble |
| 6 | 80 | | | 10 | 10 | Soluble, melts, $M_W$ 71,469 |
| 7 | 70 | | | 15 | 15 | Soluble, $M_W$ 237,599 polymodal PDI 29 |
| 8 | 90 | | | 5 | 5 | Soluble, melts, $M_W$ 5,574 |
| 9 | 50 | | | 25 | 25 | Soluble, $M_W$ 371,154, brittle film |
| 10 | 30 | | | 35 | 35 | Insoluble |
| 11 | 10 | 30 | | 30 | 30 | Insoluble, appears to melt |
| 12 | 20 | | | 40 | 40 | Insoluble |
| 13 | 10 | | | 45 | 45 | Insoluble |
| 14 | 80 | | | 8 | 12 | Soluble, $M_W$ 85, 162 |

Example 15

A 250 ml round bottom flask is loaded with bis-triphenylphosphine nickel dichloride (1.05 g), triphenylphosphine (6.35 g), activated zinc dust (5.7 g), sodium bromide (0.85 g), and N-methylpyrrolidinone (NMP) (120 ml) in an inert atmosphere box. The flask is closed and brought out of the inert atmosphere box. 1,3-dichlorobenzene (2.3 g), 2,5-dichlorobenzophenone (19.7 g), 1,3,5-trichlorobenzene (0.36 g), and 4-chlorobenzophenone (0.43 g) are added and the flask is maintained under an inert atmosphere. Sufficient cooling is applied to maintain the temperature of the exothermic reaction at approximately 80° C. to 85° C. After about 15 minutes the mixture becomes viscous. When the exotherm subsides the flask is heated to 65° C. with stirring for 2 hr. The mixture is cooled to room temperature, stirred with ethanolic HCl, and washed with hot ethanol and then hot acetone. The resulting white solid is filtered and dried. The product is a lightly branched polyphenylene based copolymer which is soluble and processable.

Example 16

A 250 ml round bottom flask is loaded with bis-triphenylphosphine nickel dichloride (1.02 g), triphenylphosphine (6.40 g), activated zinc dust (5.38 g), sodium bromide (0.84 g), and N-methylpyrrolidinone (NMP) (120 ml) in an inert atmosphere box. The flask is closed and brought out of the inert atmosphere box. 1,3-dichlorobenzene (1.40 g), 2,5-dichlorobenzophenone (18.6 g), 1,3,5-trichlorobenzene (1.03 g), and chlorobenzene (0.64 g) are added and the flask is maintained under an inert atmosphere. Sufficient cooling is applied to maintain the temperature of the exothermic reaction at approximately 80° C. to 85° C. After about 15 minutes the mixture becomes viscous. When the exotherm subsides the flask is heated to 65° C. with stirring for 2 hr. The mixture is cooled to room temperature, stirred with ethanolic HCl, and washed with hot ethanol and then hot acetone. The resulting white solid is filtered and dried. The product is a lightly branched polyphenylene based copolymer which is soluble and processable.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. In particular, it is to be understood that this invention is not limited to the particular methodology, protocols, and reagents described as such may vary, as will be appreciated by one of skill in the art. The scope of the invention is, therefore, indicated by the following claims rather than by the foregoing description. All changes, modifications, and variations coming within the meaning and range of equivalency of the claims are to be considered within their scope.

What is claimed is:

1. A polymer having the general formula:

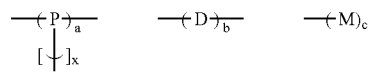

where P is a polyvalent arylene branching repeat unit, D is a divalent arylene repeat unit, M is a monovalent arylene endcapping unit, a, b and c are the relative mole fractions of P, D and M, respectively, and x represents the number of bonds beyond two connecting P to the polymer, wherein $x \geq 1$.

2. The polymer of claim 1, further comprising a solubilizing side group.

3. The polymer of claim 1, further comprising a reactive side group.

4. The polymer of claim 1 wherein P comprises 1,3,5-phenylenetriyl.

5. The polymer of claim 1 wherein D comprises 1,4-benzoylphenylene.

6. The polymer of claim 1 wherein D comprises 1,3-benzoylphenylene.

7. The polymer of claim 1, wherein M comprises phenyl.

8. The polymer of claim 1, comprising at least two different monovalent repeat units.

9. The polymer of claim 1, comprising at least two different divalent repeat units.

10. The polymer of claim 1, comprising at least two different polyvalent repeat units.

11. The polymer of claim 1, wherein P is 1,3,5-phenylenetriyl, D is selected from the group consisting of 1,3-phenylene, 1,4-phenylene, 1,3-benzoylphenylene; 1,4-benzoylphenylene, and mixtures thereof, and M is selected from the group consisting of phenylene, 2-benzoylphenylene, 3-benzoylphenylene, 4-benzoylphenylene, and mixtures thereof.

12. The polymer of claim 1, wherein a is about 0.04, b is about 0.92, and c is about 0.04.

13. The polymer of claim 1, wherein b>0.90, a=c, and a+b+c=1.

14. The polymer of claim 1, wherein b>0.90, a<c, and a+b+c=1.

15. The polymer of claim 1, wherein b>0.90, a>c, and a+b+c=1.

16. The polymer of claim 1, wherein b>0.95, a=c, and a+b+c=1.

17. The polymer of claim 1, wherein b>0.95, a<c, and a+b+c=1.

18. The polymer of claim 1, wherein b>0.95, a>c, and a+b+c=1.

19. The polymer of claim 1, wherein 0.001<a<0.4 and a+b+c=1.

20. The polymer of claim 1, wherein 0.005<a<0.3 and a+b+c=1.

21. The polymer of claim 1, wherein 0.01<a<0.25 and a+b+c=1.

22. A molding compound comprising the polymer of claim 1.

23. A foam comprising the polymer of claim 1.

24. A composite comprising the polymer of claim 1.

25. A coating comprising the polymer of claim 1.

26. A polymer blend comprising the polymer of claim 1.

27. An optical or opthalmic lens comprising the polymer of claim 1.

28. A dielectric film comprising the polymer of claim 1.

29. An extruded part comprising the polymer of claim 1.

30. A molded part comprising the polymer of claim 1.

31. A solution comprising the polymer of claim 1.

32. A polymer having the formula:

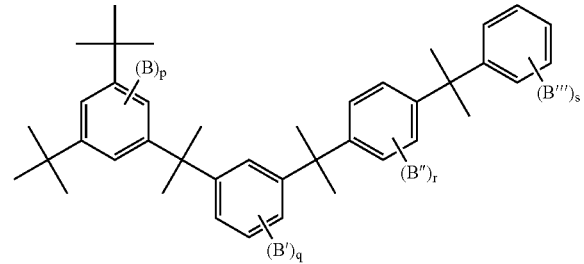

wherein B, B', B", and B'" are side groups, which may be the same or different, and which are independently selected from the group consisting of nil, alkyl, aryl, alkaryl, aralkyl, alkyl amide, aryl amide, alkyl ester, aryl ester, alkoxy, polyalkeneoxy, polyphenylene oxide, polyphenylene sulfide, polyvinyl chloride, polyalkylmethacrylate, polyacrylonitrile, polyalkylvinyl ether, polyvinyl alcohol, polyvinyl acetate, perfluoroalkyl, perfluoroalkoxy, polyester, polyamide, polyimide, poly(phenoxyphenyl ketone), amide, ester, ether, sulfone, aryl ketone, alkyl ketone, heteroaryl, and NRR', p is 0, 1, 2 or 3, q is 0, 1, 2, 3, or 4, r is 0, 1, 2, 3, or 4, and s is 0, 1, 2, 3, 4, or 5.

33. The polymer of claim 32, wherein one or more of the side groups, B, B', B", or B'" is reactive.

34. The polymer of claim 33, wherein one or more of the side groups, B, B', B", or B'" is selected from the group consisting of epoxy, ethynyl, phenylethynyl, acetals, acetals from ethylvinylether, acetylenes, acid anhydrides, acrylamides, acrylates, aldehydes, alkyl aldehydes, alkyl halides, alkyl nitriles, aryl aldehydes, aminoalkyl, aminoaryl, aminophenoxy, aminobenzoyl, anilines, azides, benzocyclobutenes, biphenylenes, carbonates, carboxylic acids and their salts, carboxylic acid halides, cyanates, epoxides, fulvenes, halides, heteroaryls, hydrazines, hydroxyls, hydroxylamines, monohydroxyalkyl, hydroxyaryl, hydroxyphenoxy, hydroxybenzoyl, amides, esters, amines, imides, imines, isocyanates, ketals, ketones, maleimides, nadimides, olefins, phenols, phosphates, phosphonates, quaternary amines, silanes, silicates, silicones, sulfonic acids and their salts, sulfonyl halides, tetrahydropyranyl ethers, thioethers, urethanes, vinyl ethers, and vinyls.

35. A molding compound comprising the polymer of claim 32.

36. A foam comprising the polymer of claim 32.

37. A composite comprising the polymer of claim 32.

38. A coating comprising the polymer of claim 32.

39. A polymer blend comprising the polymer of claim 32.

40. An optical or opthalmic lens comprising the polymer of claim 32.

41. A dielectric film comprising the polymer of claim 32.

42. An extruded part comprising the polymer of claim 32.

43. A molded part comprising the polymer of claim 32.

44. A solution comprising the polymer of claim 32.

45. A polymer composition prepared by reductive polymerization of at least one aromatic monofunctional monomer having one X group (an endcapper), at least one aromatic difunctional monomer having two X groups (a linear monomer), and at least one aromatic polyfunctional monomer having three or more X groups (a branching monomer), wherein the X groups are selected from the group consisting of chloro, bromo, and sulfonate ester —SO$_3$R, wherein R is alkyl, aryl, fluoroalkyl, or fluoroaryl.

46. The polymer composition of claim 45, wherein at least one monomer comprises a single ring.

47. The polymer composition of claim 45, wherein at least one monomer comprises a multiple ring.

48. The polymer composition of claim 45, wherein at least one monomer comprises a fused ring.

49. A molding compound comprising the polymer composition of claim 45.

50. A foam comprising the polymer composition of claim 45.

51. A composite comprising the polymer composition of claim 45.

52. A coating comprising the polymer composition of claim 45.

53. A polymer blend comprising the polymer composition of claim 45.

54. An optical or opthalmic lens comprising the polymer composition of claim 45.

55. A dielectric film comprising the polymer composition of claim 45.

56. An extruded part comprising the polymer composition of claim 45.

57. A molded part comprising the polymer composition of claim 45.

58. A solution comprising the polymer composition of claim 45.

* * * * *